(12) United States Patent
Yamamoto

(10) Patent No.: US 7,577,155 B2
(45) Date of Patent: Aug. 18, 2009

(54) PRINTER WITH AUTOMATIC ACQUISITION AND PRINTING OF NETWORK ADDRESS

(75) Inventor: Tetsuji Yamamoto, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 518 days.

(21) Appl. No.: 11/092,331

(22) Filed: Mar. 29, 2005

(65) Prior Publication Data

US 2005/0267989 A1 Dec. 1, 2005

(30) Foreign Application Priority Data

May 31, 2004 (JP) .............................. 2004-161190

(51) Int. Cl.
| H04L 12/56 | (2006.01) |
| H04L 12/28 | (2006.01) |
| G06F 3/12 | (2006.01) |
| G06F 3/00 | (2006.01) |

(52) U.S. Cl. ...................... 370/400; 370/401; 370/402; 358/1.15; 710/8

(58) Field of Classification Search ................ 370/400, 370/401, 402; 358/1.15
See application file for complete search history.

(56) References Cited

U.S. PATENT DOCUMENTS

| 5,559,933 | A | * | 9/1996 | Boswell | ..................... 358/1.15 |
| 6,301,012 | B1 | * | 10/2001 | White et al. | ................ 358/1.15 |
| 2001/0019341 | A1 | * | 9/2001 | Tsuruoka | ...................... 347/12 |
| 2003/0177220 | A1 | * | 9/2003 | Ohara | ......................... 709/223 |
| 2003/0189722 | A1 | * | 10/2003 | Yoshikawa | ................. 358/1.15 |

FOREIGN PATENT DOCUMENTS

JP 11-42836 2/1999

OTHER PUBLICATIONS

"Understanding UPnP: A White Paper". UPnP Forum. Jun. 2000. [http://www.upnp.org/download/UPNP_UnderstandingUPNP.doc].*
"Axis 5500 / Axis 5550 User's Guide". Axis Communications. Mar. 2003.*

* cited by examiner

*Primary Examiner*—Daniel J Ryman
*Assistant Examiner*—Andrew Oh

(57) ABSTRACT

A printer and printer system that is capable of quickly acquiring a network address and connection, and quickly reporting the same to the user. The printer is part of a network and is thus configured to connect to the network and communicate with other devices connected to the network. The printer includes a printing unit that prints on paper or other recording medium, and an address acquisition unit, which communicates with one or more of the other network devices over the network to acquire network parameters, including an IP address, for the printer. When a network address is thus acquired, the address acquisition unit causes the printing unit to print the acquired address to so inform the user.

3 Claims, 5 Drawing Sheets

PRINTER WITH AUTOMATIC ACQUISITION AND PRINTING OF NETWORK ADDRESS

BACKGROUND OF THE INVENTION

1. Field of the Invention

The present invention relates to a printer, a printer system that includes a printer and a printer server, and a method, which may be performed by either the printer or printer server, and which, automatically and without user intervention, quickly acquires a network address for the printer, and quickly informs a user of that fact and that a network connection has been established.

2. Description of the Related Art

Network printers are commonly used on networks, such as local area networks (LANs), for printing in response to print commands sent from multiple client terminals on the network. Such a network printer communicates with the individual client devices using an appropriate protocol, e.g., TCP/IP, to send and receive print commands and print data. Printers and other network devices that communicate with other devices on a LAN using TCP/IP first acquire specific network parameters including the IP address, the subnet mask for that IP address, and the gateway, and use these network parameters to communicate with other devices.

Various methods can be used to acquire the network parameters. One common method is by using the Dynamic Host Configuration Protocol (DHCP). DHCP is a protocol for automatically assigning an IP address and other network parameters to a device when the device starts up or connects to the network. Once DHCP is enabled, network parameters are automatically assigned to each device, thus eliminating the need for the network administrator or user to manually assign the network parameters. As a result, when a DHCP-enabled device is connected to the network and turned on, the device will be automatically recognized by other devices on the network without intervention by the user, thereby enabling access to printers and other data devices on the network. In order to use DHCP, however, a DHCP server for assigning IP addresses must also be connected to the network. IP address allocation using DHCP is described briefly below.

After a device is turned on and connected to a network (such a device is referred to as a "client device" below because it is a client requesting a service, i.e., an IP address from the server), the client device broadcasts a DISCOVER packet to all other devices on the network in order to locate the DHCP server. Any device that receives this DISCOVER packet but which is not the DHCP server simply ignores the packet. However, if the device receiving the DISCOVER packet is the DHCP server, the DHCP server then sends an OFFER packet reporting the usable network settings to the client device and thus tells the client device that a DHCP server is available.

After the client device receives the OFFER packet in reply from the DHCP server, the client device broadcasts a network settings REQUEST packet over the network telling the DHCP server that the client device intends to use the offered IP address and other network parameters. A new client device to be added to the network can thus acquire an IP address and can thereafter communicate directly, i.e., one-to-one, with other devices on the network.

A different method of determining IP addresses is called Automatic Private IP Addressing (APIPA). Using the APIPA protocol the client device randomly selects and assigns itself an IP address in the range 169.254.1.0 to 169.254.254.255. The client device then broadcasts an ARP (Address Resolution Protocol) packet using the selected IP address to the other devices on the network. Each network device receives this discover packet and compares the IP address in the packet with the IP address assigned to itself. If the IP address in the discover packet matches the IP address assigned to the network device that received the packet, that network device generates and broadcasts a reply packet over the network.

If the network device that sent the discover packet thus receives a reply from another network device, the client device requesting an address knows that the selected IP address is already in use, therefore selects another IP address, and broadcasts a new ARP discover packet containing this newly selected IP address. If a reply packet responding to this discover packet is not received, the client device knows that the IP address in the discover packet is available, that is, the IP address is not currently being used by another device on the network. By thus selecting this IP address for its own IP address, the requesting client device acquires a unique IP address, that is, an IP address that is not already used by another network device.

By using APIPA, a requesting client device can thus communicate with other systems on the network with no awareness of network IP addresses. However, APIPA assumes a small-scale network, and a router cannot route packets exchanged using IP addresses acquired by the APIPA protocol. This means that the communication range of a client device using an IP address acquired using the APIPA protocol is limited to the local network (specifically, the packet broadcasting range), and such client devices cannot communicate through a router with devices on a different network. Communication between networks is thus not possible using addresses acquired with the APIPA protocol.

General-purpose operating systems typically first attempt to acquire an IP address using DHCP, and then acquire an IP address using APIPA if getting an IP address using DHCP fails. This function of acquiring an IP address by first using DHCP and then using APIPA if DHCP fails, is referred to herein as a "dynamic IP address resolution function."

When an IP address is assigned to a client device by means of this dynamic IP address resolution function, the user must use utility software or enter specific commands in order to learn the assigned IP address.

Furthermore, the Media Access Control (MAC) address and IP address information stored on the DHCP server connected to the network must be searched to get the IP address information that is assigned to a particular device when DHCP is used.

This operation is possible if the client device is a personal computer having a display, but the IP address cannot be displayed using this method if the client device does not have a display or if the display area is too small to present the IP address, such as when the client device is a network printer.

The time required to get an IP address using this dynamic IP address resolution function is on average between 10 and 20 seconds from the time the client device power is turned on and started up, if the IP address is successfully assigned by DHCP. If address assignment by DHCP fails and the IP address is determined by APIPA, however, an average of approximately 1 minute is required from when the device boots up. Because 1:1 communication with other network devices is not possible until the IP address is determined, the foregoing method must be repeatedly used to determine if the IP address has been assigned and communication enabled. However, while this method can be used on a personal computer, a network printer cannot use this method to easily determine if the IP address has been assigned and quickly inform the user that the IP address was set.

SUMMARY OF THE INVENTION

The present invention is directed to solving the above-described problems. Accordingly, an object of this invention is to provide a printer and a printer system, wherein the printer can quickly inform its user that an IP address has been acquired, following acquisition by the printer using the dynamic IP address resolution function, and can further report that a network connection has been established. The present invention achieves the foregoing object by means of any of the following arrangements.

According to one aspect of the present invention, a printer that is capable of being connected to a network to which multiple other devices are connected is provided. Such a printer comprises a printing unit configured to print on a printing medium; and an address acquisition unit. In accordance with the invention, the address acquisition unit is configured to automatically and without user intervention (i) acquire a network address by communicating with one or more of the multiple other devices over the network, and (ii) cause the printing unit to print the network address when the address is acquired and when the printing of the network address is enabled.

Preferably, the address acquisition unit first attempts to acquire the address by communication with a server in the network that is configured to run a dynamic host configuration protocol (DHCP). If acquisition by communication with the DHCP server fails, then the address acquisition unit acquires the address by automatic private IP addressing (APIPA).

In another aspect, the invention involves a printer system that comprises a printer configured to print on a printing medium; and a printer server configured to connect the printer to a network to which multiple other devices are also connected. The printer server comprises an address acquisition unit configured to (i) acquire a network address automatically and without user intervention by communicating with one or more of the multiple other devices over the network, and (ii) cause the printing unit to print the network address when the address is acquired and when the printing of the network address is enabled.

In preferred embodiments, the address acquisition unit first attempts to acquire the address by communication with a server in the network that is configured to run a dynamic host configuration protocol (DHCP), and then if that fails, acquires the address by automatic private IP addressing (APIPA).

In some embodiments, the printing of the network address can be disabled, if desired.

According to another aspect, the invention involves a method for acquiring a network address for a printer to be connected to a network to which multiple other devices are connected. All of the steps of the method are performed automatically and without user intervention. The method comprises attempting to acquire a network address for the printer using dynamic host configuration protocol (DHCP). Then, either the network address of the printer is set to the acquired network address, if the attempted acquisition by DHCP is successful, or a network address for the printer is acquired using automatic private IP addressing (APIPA). In either case, a user of the printer is then informed that the printer is connected to the network.

Thus, in accordance with embodiments of the invention, a printer can acquire an IP address and other network parameters using a dynamic IP address resolution function, and can automatically print a report indicating that the printer has connected to the network when the IP address and other network parameters are acquired. Furthermore, this report is printed automatically without requiring any user intervention, e.g., to enter a command or use a utility program.

Thus, after turning the printer power on, but without performing any terminal operations, the user can easily determine if the printer has connected to the network by simply confirming whether or not a sheet indicating that the IP address has been resolved has been printed. The user can therefore quickly start using the printer (substantially simultaneously to the printer being connected to the network) without having to execute a bothersome confirmation process.

The automatic printing of this report can be turned off, if desired.

Other objects and attainments together with a fuller understanding of the invention will become apparent and appreciated by referring to the following description and claims taken in conjunction with the accompanying drawings.

DESCRIPTION OF THE PREFERRED EMBODIMENTS

While the invention will be described in conjunction with the preferred embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

Figure 1:
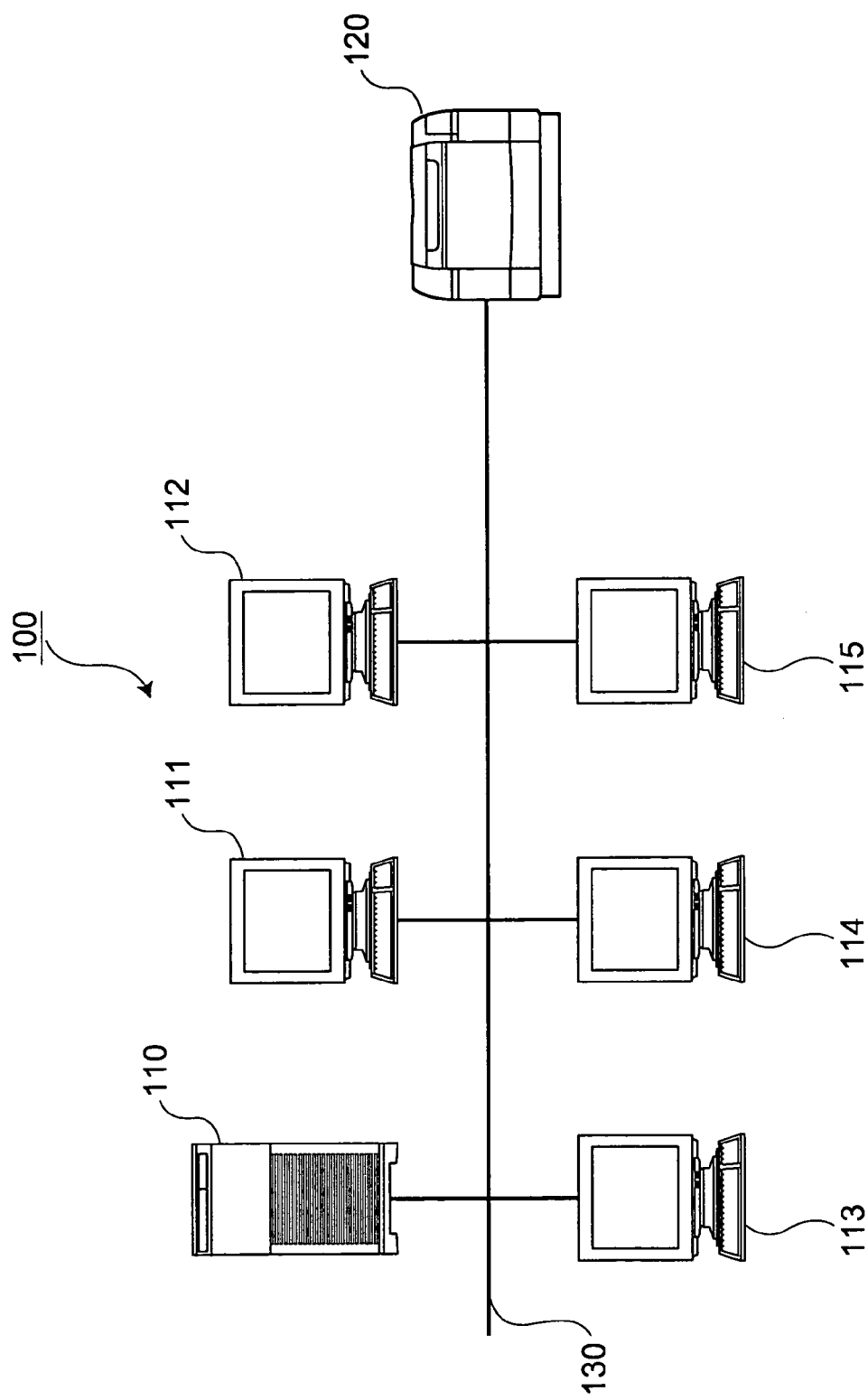
FIG. 1 is a schematic diagram showing a network to which a printer, configured according to a preferred embodiment of the present invention, is connected.

As shown in FIG. 1, a printer 120 according to an embodiment of the invention is a network device connected to a network 100 composed of multiple other devices connected to via a common network cable 130. This network 100 includes a server 110 that also functions as a DHCP server, and a plurality of client terminals 111 to 115 each having a display and a CPU. In the illustrated embodiment, the server 110, client terminals 111 to 115, and printer 120 are physically connected in this network 100 via a network cable 130, and can send and receive data with other devices on the network by setting or acquiring a unique IP address that does not conflict with the address of any other device on the network.

While a physical network cable 130 is used in the illustrated embodiment to interconnect the network devices, the invention is not limited to that arrangement. The network devices could be wirelessly connected using a wireless LAN conforming to the IEEE 802.11a, IEEE 802.11b, IEEE 802.11g, or other protocol. Indeed, the terms "connected to," "in communication with," and other similar terminology, which in a specific instance may refer to either direct or indirect connection, coupling, or communication, are not intended to limit the invention to any particular form of communication.

Figure 2:
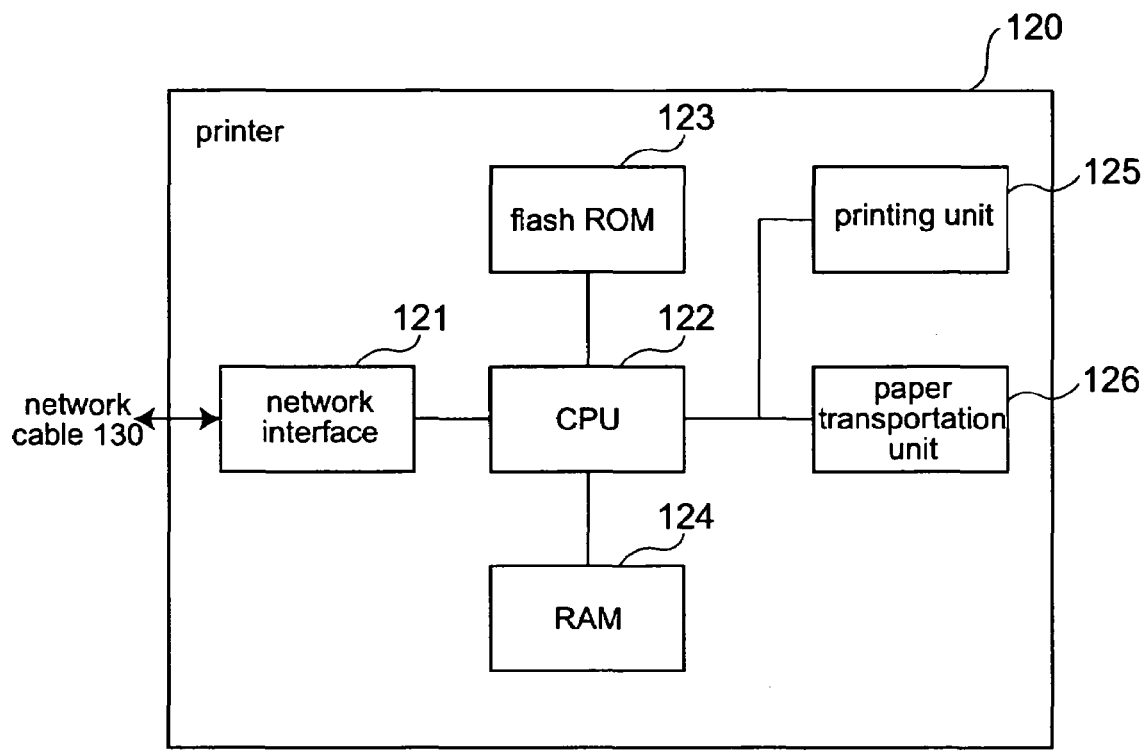
FIG. 2 is a schematic circuit block diagram of the printer.

As shown in FIG. 2, printer 120 has a network interface 121 enabling the printer to connect to network 100 via network cable 130. Printer 120 also includes a CPU 122, a flash ROM 123, a RAM 124, a printing unit 125, and a paper transportation unit 126.

Network interface 121 is a communication interface to which network cable 130 is connected. Packets sent from other devices on network 100 are received, and packets generated by printer 120 are transmitted, through this network interface 121.

CPU 122 is the control center of printer 120 and thus controls the other parts of the printer.

Flash ROM 123 is rewritable nonvolatile memory and can thus retain the content written thereto after the power to printer 120 is turned off. Flash ROM 123 stores firmware for operating printer 120, and CPU 122 controls printing and other operations of printer 120 by running the firmware stored in flash ROM 123.

Data acquired or generated by printer 120 that should be retained after the power is turned off is written to rewritable flash ROM 123 in this embodiment of the invention. Data thus written to flash ROM 123 includes the settings related to the IP address acquisition method in this embodiment of the invention.

RAM 124 is volatile memory and is the main data storage area in printer 120. RAM 124 functions as a receive buffer for temporarily storing received data, and as a print buffer for temporarily storing print data.

Printing unit 125 is composed of a dot impact, thermal, inkjet, or other type of print head, or the functional parts of a laser printer. Printing unit 125 is thus capable of forming an image or text representing the print data on a specific recording medium (e.g., paper) based on commands from CPU 122.

Paper transportation unit 126 conveys the print medium along a transportation path (not shown) inside printer 120, and includes a motor for driving transportation rollers and a driver for controlling the motor.

Figure 3:
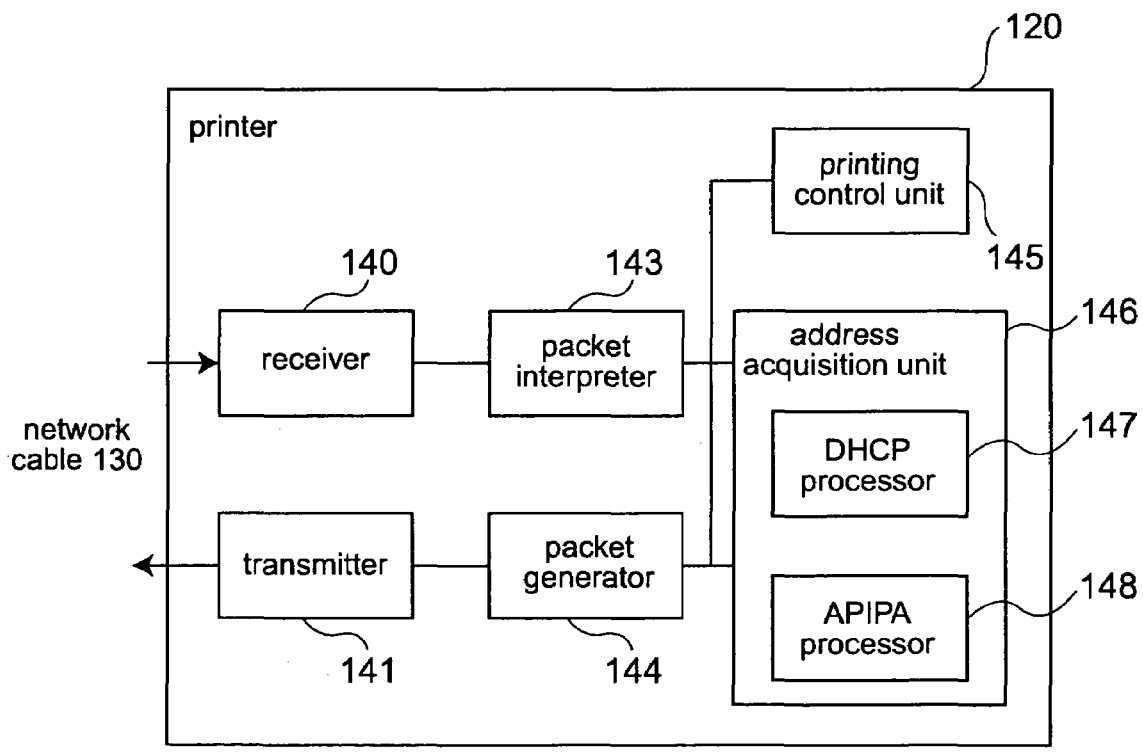
FIG. 3 is a functional block diagram of the printer.

Functional units for controlling printer 120 are shown in FIG. 3. The functions of these units are achieved as a result of CPU 122 running the firmware stored in flash ROM 123 in this embodiment of the invention.

Receiver 140 is the functional unit for receiving data from any of the other devices in network 100 via network cable 130. Packet data received by receiver 140 is then sent to and interpreted by packet interpreter 143. Commands are then sent to printing control unit 145 and address acquisition unit 146 according to the content, as interpreted by packet interpreter 143.

Packet generator 144 is the functional unit for generating the packets transmitted over network 100 via network cable 130. The packets generated by packet generator 144 are output through transmitter 141 to network cable 130.

Printing control unit 145 controls the operation of printing unit 125 and paper transportation unit 126. Printing control unit 145 drives printing unit 125 and paper transportation unit 126 based on the print data to be printed.

Address acquisition unit 146 is the functional unit for acquiring the IP address and other network parameters and thus communicably connecting printer 120 to network 100. Address acquisition unit 146 has a DHCP processor 147 for getting the network parameters using DHCP, and an APIPA processor 148 for getting the network parameters using APIPA. DHCP and APIPA processors 147 and 148 operate in the same way as do their equivalent prior art components.

More specifically, DHCP processor 147 sends a request packet to the other devices 110 to 115 on network 100. When a reply packet containing the usable network settings is then received from DHCP server 110, DHCP processor 147 broadcasts a configuration request packet over the network and thus requests the network parameters including a valid IP address from server 110. DHCP processor 147 then receives the network parameters including the IP address from server 110 in response to this request, and thus acquires an IP address.

APIPA processor 148, however, randomly selects an IP address for printer 120 in the range 169.254.1.0 to 169.254.254.255, and then broadcasts a request packet containing the selected IP address to the other devices 110 to 115 on network 100. Each of the devices 110 to 115 receiving this request packet then compares the IP address in the received packet with the IP address assigned to itself, and if the received IP address and the device's IP address are the same, that device generates and broadcasts a reply packet over the network.

If a reply packet is returned from one of the other devices 110 to 115, APIPA processor 148 knows that that IP address is already in use. APIPA processor 148 therefore selects a different IP address and broadcasts another request packet addressed to that different IP address. If a reply packet to a particular request packet is not received, APIPA processor 148 knows that the IP address in that request packet is not being used by another device on the network. APIPA processor 148 thus acquires a unique IP address, that is, an IP address that is not used at the same time by another device on the network, and assigns that IP address to printer 120.

Address acquisition unit 146 could also set the IP address and other network parameters stored in flash ROM 123, for example, for printer 120, rather than dynamically acquiring the network parameters over the network 100. In this embodiment, address acquisition unit 146 determines whether to acquire the network parameters manually or automatically by reading the network parameters from flash ROM 123. If address acquisition unit 146 acquires the IP address automatically using DHCP, automatically acquires an IP address using APIPA, or sets the network parameters stored in flash ROM 123 as the network parameters of printer 120 after attempting to acquire the network parameters via DHCP and APIPA, address acquisition unit 146 prints an IP address resolution sheet containing the IP address and other network parameters after the parameters are set.

Printing the IP address resolution sheet can also be turned off using a common browser, for example. More specifically, a browser can be used on any of the client terminals 111 to 115 to call the configuration file stored in printer 120 and to turn the printing of the IP address resolution sheet either on or off by means of a pull down menu displayed in the browser or the client machine. Paper consumption caused by printing the IP address resolution sheets each time printer 120 turns on can thus be reduced. The browser can also be used to turn printing the IP address resolution sheet on again as desired.

Figure 4:
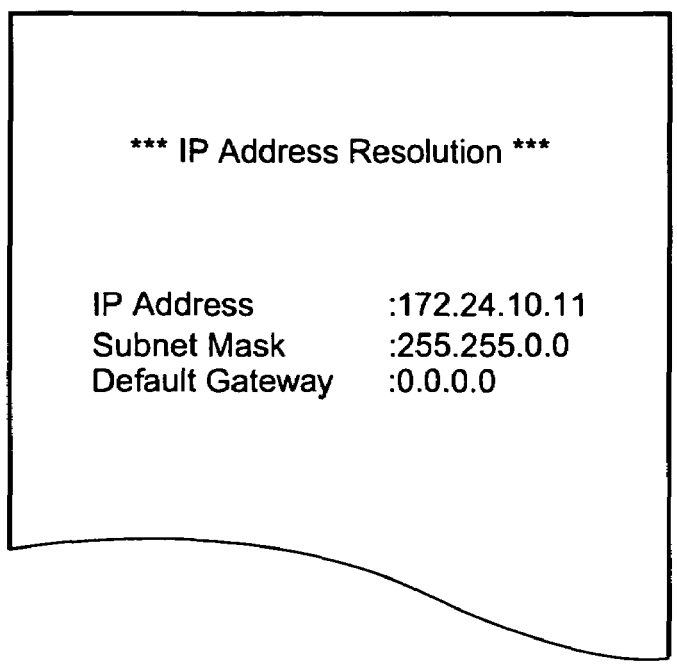
FIG. 4 is a sample IP address resolution output by the printer.

The IP address determined by address acquisition unit 146, the subnet mask, and the gateway address can be printed on the IP address resolution sheet as shown in FIG. 4. The user will thus know from the printed IP address resolution sheet that printer 120 has acquired the IP address and other network parameters.

Figure 5:
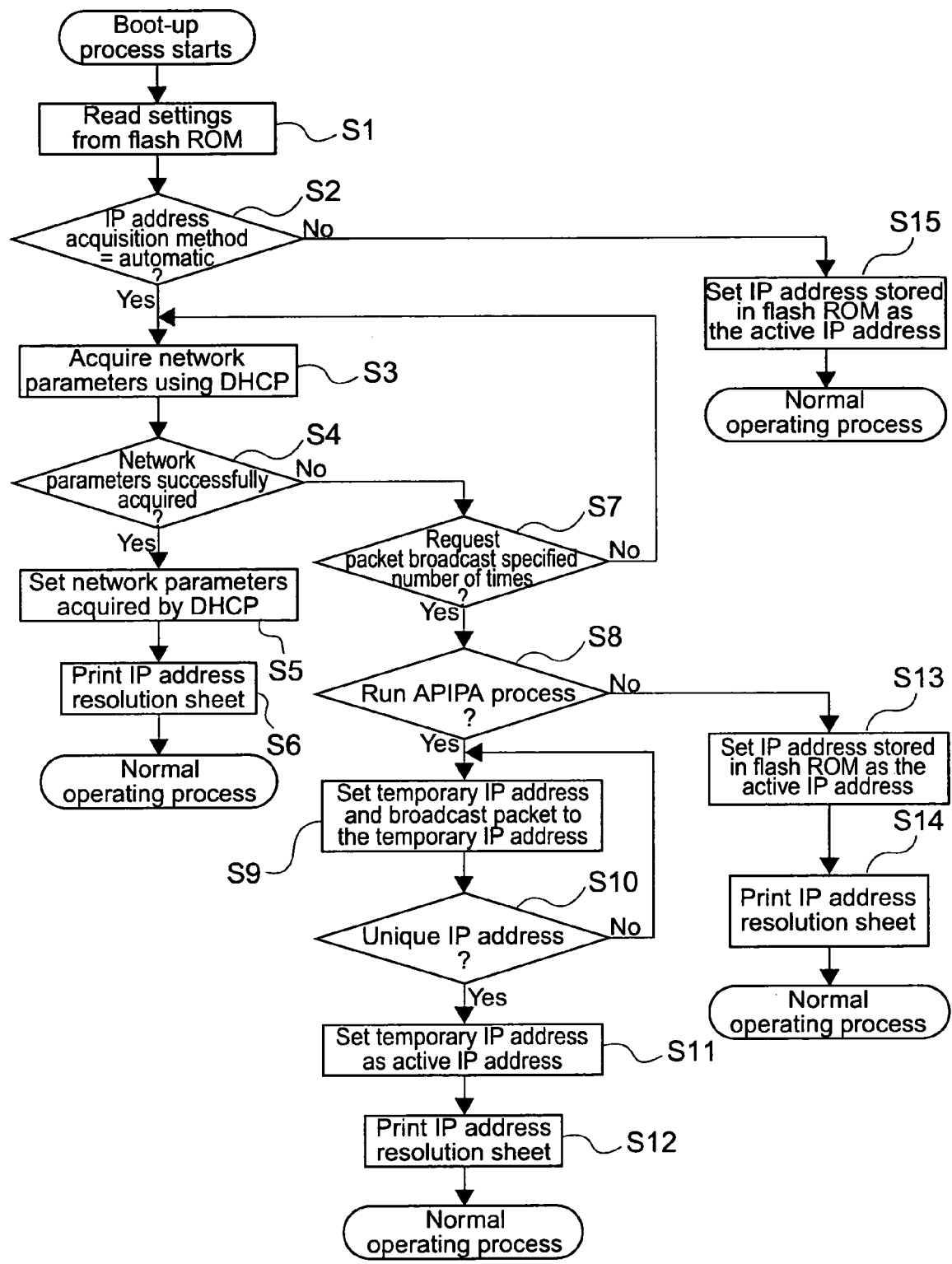
FIG. 5 is a flow chart describing the operation of the printer, in accordance with embodiments of the invention.

The operation whereby printer 120 acquires the IP address is described next with reference to the flow chart in FIG. 5. Other network parameters such as the subnet mask and gateway address are also acquired when the IP address is acquired automatically. Acquiring network parameters, including the IP address, is described below.

When the power to printer 120 is turned on, the boot program stored in flash ROM 123 of printer 120 is initiated and run and printer 120 performs its startup procedure. A program for setting the network parameters is also run either as part of the printer's startup program or after the startup program ends.

The first step is to read the settings related to the network parameters stored in flash ROM 123 (step S1). As described above, these settings include whether to get the network parameters automatically or manually, and based on this setting, CPU 122 determines whether to get the network parameters automatically or manually (step S2).

If the network parameters are acquired manually, control goes to step S15, in which case the network parameters stored in flash ROM 123 are set as the active network parameters, and the process for setting the network parameters thus ends. Printer 120 thus enters the normal operating mode and prints in accordance with print requests from server 110 and client terminals 111 to 115.

If the network parameters are acquired automatically, control goes to step S3, in which case the network parameters are requested using DHCP. More specifically, a DISCOVER packet is broadcast to all other devices on the network in order to locate the DHCP server, and a REQUEST packet is sent to the DHCP server if it is found in an attempt to get the network parameters.

If the network parameters are successfully acquired from the DHCP server (step S4 returns yes), the network parameters acquired from the DHCP server are set as the active network parameters of printer 120, and the setting of the network parameters is finished. Once printer 120 thus connects to the network, the printer prints an IP address resolution sheet, such as the one shown in FIG. 4, and thereby informs the user that printer 120 is connected to the network (step S6). Printer 120 thus enters the normal operating mode and prints in accordance with print requests from server 110 and client terminals 111 to 115.

If the network parameters have not been acquired within a specified time after network parameter acquisition by DHCP starts in step S3 (step S4 returns no), control goes to step S7 to determine if packets for discovering the DHCP server have been broadcast a specified number of times. If printer 120 has not broadcast the DHCP server DISCOVER packets a specified number of times (step S7 returns no), control loops back to step S3 and the DHCP server discover packet is broadcast again. However, if the DHCP server DISCOVER packet has been broadcast the specified number of times and a response from the DHCP server is still not received, or if the network parameters cannot be acquired for some other reason, control moves to step S8.

The network parameter-related settings are then read from flash ROM 123 to determine if APIPA is enabled. If APIPA is enabled (step S8 returns yes), the APIPA process is run in an attempt to acquire the network parameters.

More specifically, a temporary IP address is selected (step S9) and a packet addressed to the selected IP address is broadcast to the other devices on network 100. If this temporary IP address is not duplicated and is not already in use by another device (step S10 returns yes), the temporary IP address is set as the active IP address, and the setting of the network parameters is completed (step S11). Once printer 120 thus connects to the network, the printer prints an IP address resolution sheet such as the one shown in FIG. 4 and thus informs the user that printer 120 is connected to the network (step S12). Printer 120 thus enters the normal operating mode and prints in accordance with print requests from server 110 and client terminals 111 to 115.

However, if step S10 confirms that the temporary IP address duplicates an IP address that is already in use on the network (step S10 returns yes), control loops back to step S9 and a different IP address is selected and broadcast. Steps S9 and S10 thus repeat until a valid IP address is found, and steps S11 and S12 are then executed when a valid IP address is found.

If step S8 determines that APIPA is not enabled (step S8 returns no), the network parameters stored in flash ROM 123 are read and set as the active network parameters (step S13), and the setting of the network parameters thus ends. Printer 120 then prints an IP address resolution sheet, such as the one shown in FIG. 4, and thereby informs the user that the printer is connected to the network (step S14). Printer 120 thus enters the normal operating mode and prints in accordance with print requests from server 110 and client terminals 111 to 115.

As described above, and according to this embodiment of the invention, a printer 120 that is connected to a network 100 to enable that printer to communicate with other devices connected to the same network thus includes a printing unit 125 for printing on paper or other recording medium, and an address acquisition unit 146 for communicating with one or more of the multiple other network devices over network 100 to acquire network parameters including an IP address enabling communication over the network 100. Address acquisition unit 146 then causes printing unit 125 to print the acquired network parameters when a valid address is acquired. The network parameters can be acquired automatically using DHCP or APIPA.

When an IP address and other network parameters are acquired for printer 120 using a dynamic IP address resolution function, the acquired parameters are thus automatically printed out to inform the user of that printer that printer 120 has connected to network 100, without requiring the user to input commands or use a utility program. Without operating a computer terminal, for example, after turning the power of printer 120 on, the user can thus easily determine if the printer has connected to the network by simply confirming if the IP address resolution sheet has been printed. The user can therefore quickly start using the printer (nearly the same time that the printer becomes connected to the network) without having to execute a bothersome confirmation process.

Figure 6:
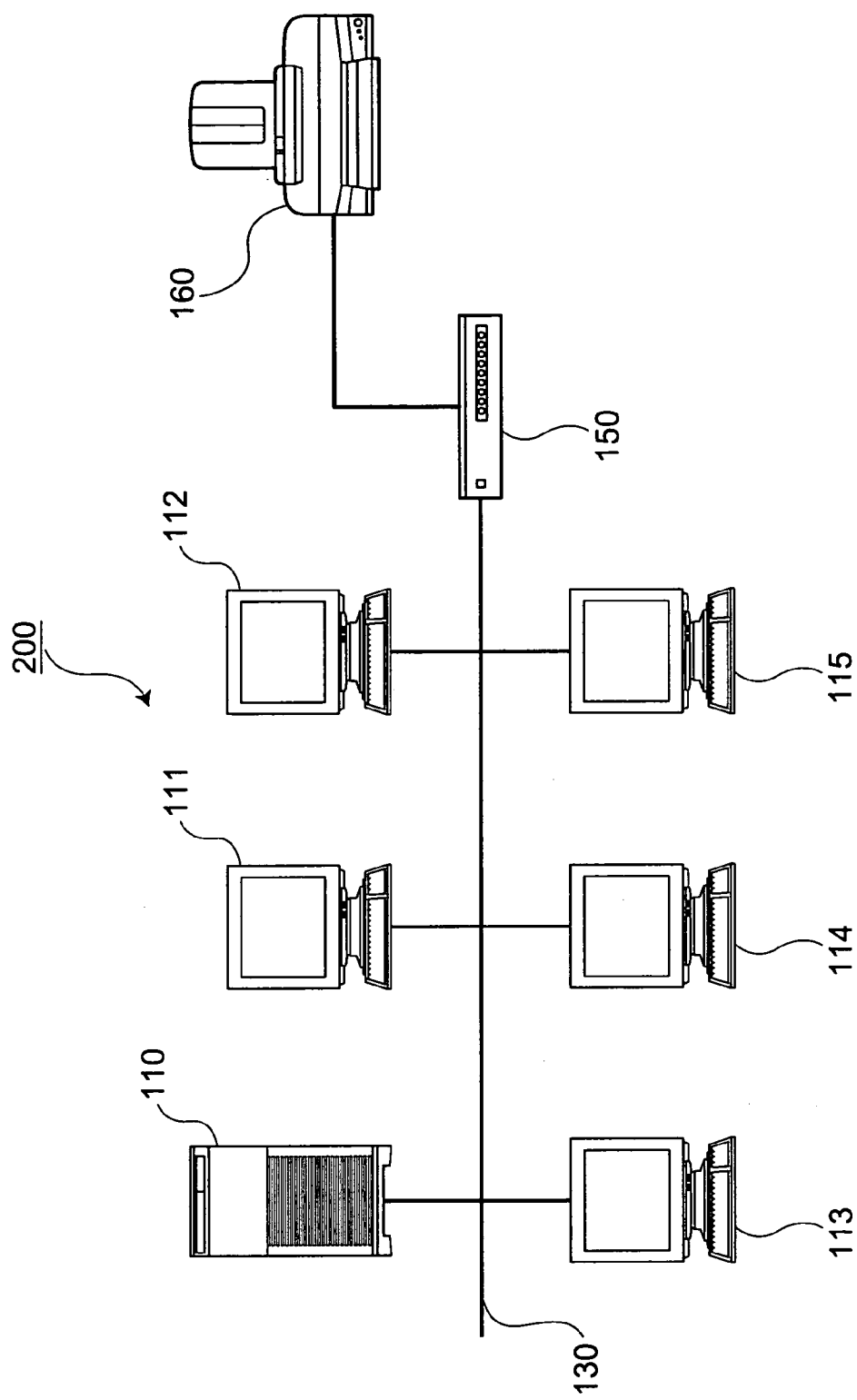
FIG. 6 is a schematic diagram showing another network to which a printer configured in accordance with the invention can be connected.

A network printer is used by way of example as printer 120 in the above-described embodiments of the invention, but the invention is not limited to a network printer. For example, the present invention can also be used to the same effect on a network 200 such as that shown in FIG. 6 in which a local printer 160 that does not have a network connection function is connected to network 200 through a printer server 150.

In this application, printer server 150 communicates with the other devices 110 to 115 on network 200 to acquire the network parameters by DHCP or APIPA. As a result, printer server 150 is also handled as one of the devices on network 200. After printer server 150 finishes getting and setting the network parameters, the printer server instructs local printer 160 to print an IP address resolution sheet such as the one shown in FIG. 4. Local printer 160 thus prints the IP address resolution sheet, informing the user that the local printer is now available to the network.

The acquired IP address and other network parameters are thus automatically printed out to inform the user that printer server 150 has connected to network 100 without requiring the user to input commands or use a utility program. Without operating a computer terminal, for example, after turning on the power to printer server 150, the user can thus easily determine if printer server 150 and local printer 160 have connected to the network by simply confirming whether or not the IP address resolution sheet has been printed. The user can therefore quickly start working (nearly at the same time that printer server 150 becomes connected to the network) without having to execute a bothersome confirmation process.

While the invention has been described in conjunction with specific embodiments, various alternatives, modifications and applications will be apparent to those skilled in the art in light of the foregoing description. Thus, the invention described herein is intended to embrace all such alternatives, modifications and applications as may fall within the spirit and scope of the appended claims.

What is claimed is:

1. A printer that is capable of being connected to a network to which multiple other devices are connected, the printer comprising:
    a flash ROM in which is stored a program for setting network parameters and settings related to the network parameters, including whether to acquire the network parameters automatically or manually, the program being read each time the printer is turned on;
    a printing unit configured to print on a printing medium; and
    an address acquisition unit configured to perform the following steps, automatically and without user intervention
        acquire a network address by communicating with one or more of the multiple other devices over the network, and
        cause the printing unit to print the network address when the network address is acquired and when the printing of the network address is enabled; and wherein
    the address acquisition unit
        first attempts to acquire the network address by communication with a server in the network that is configured to run a dynamic host configuration protocol (DHCP),
        acquires the network address by automatic private internet protocol addressing (APIPA), if acquisition by communication with the DHCP server fails, and
        acquires the network address from a printer memory if APIPA is not available; and wherein
    each of the multiple other devices is configured to enable or disable the printing of the network address; and wherein
    the address acquisition unit is further configured to alternatively acquire the network address manually and to perform the following steps
        set a network address stored in the printer as an active network address, and
        cause the printer to enter a normal operation mode without printing the active network address.

2. A printer system, comprising:
    a printer configured to print on a printing medium; and
    a printer server configured to connect the printer to a network to which multiple other devices are also connected, the printer server comprising:
        a flash ROM in which is stored a program for setting network parameters and settings related to the network parameters, including whether to acquire the network parameters automatically or manually, the program being read each time the printer is turned on; and
        an address acquisition unit configured to (i) acquire a network address automatically and without user intervention by communicating with one or more of the multiple other devices over the network, and (ii) cause the printer to print the network address when the network address is acquired and when the printing of the network address is enabled; and wherein
    the address acquisition unit
        first attempts to acquire the network address by communication with a server in the network that is configured to run a dynamic host configuration protocol (DHCP),
        acquires the network address by automatic private internet protocol addressing (APIPA), if acquisition by communication with the DHCP server fails, and
        acquires the network address from a printer memory if APIPA is not available; and wherein
    each of the multiple other devices is configured to enable or disable the printing of the network address; and wherein
    the address acquisition unit is further configured to alternatively acquire the network address manually and to perform the following steps
        set a network address stored in the printer as an active network address, and
        cause the printer to enter a normal operation mode without printing the active network address.

3. A method for acquiring a network address for a printer to be connected to a network to which multiple other devices are connected, the method comprising:
    reading, each time the printer is turned on, a program for setting network parameters stored in a flash ROM of the printer, including reading settings related to the network parameters;
    deciding, each time the printer is turned on, whether to acquire the network parameters automatically or manually;
    attempting to acquire a network address for the printer using dynamic host configuration protocol (DHCP);
    performing one of the following
        setting the acquired network address as that of the printer, if the attempt is successful, or
    acquiring the network address for the printer using automatic private IP addressing (APIPA), if the attempt is unsuccessful and acquiring the network address from a printer memory if APIPA is not available; and
    informing a user of the printer that the printer is connected to the network;
    wherein all of the steps of the method are performed automatically and without user intervention, and wherein
        each of the multiple other devices is configured to enable or disable the printing of the network address; and
    alternatively acquiring the network address manually and performing the following steps
        setting a network address stored in the printer as an active network address, and
        causing the printer to enter a normal operation mode without printing the active network address.

* * * * *